United States Patent
Barbier et al.

(10) Patent No.: US 9,109,878 B2
(45) Date of Patent: Aug. 18, 2015

(54) OPTICAL SYSTEM FOR MEASUREMENT OF ORIENTATION AND POSITION COMPRISING A POINT SOURCE, CENTRAL MASK, PHOTOSENSITIVE MATRIX SENSOR AND CORNER CUBE

(71) Applicant: THALES, Neuilly sur Seine (FR)

(72) Inventors: Bruno Barbier, Bordeaux (FR); Laurent Potin, Coutras (FR); Siegfried Rouzes, Le Haillan (FR)

(73) Assignee: Thales, Neuilly Sur Seine (FR)

( * ) Notice: Subject to any disclaimer, the term of this patent is extended or adjusted under 35 U.S.C. 154(b) by 0 days.

(21) Appl. No.: 14/298,821

(22) Filed: Jun. 6, 2014

(65) Prior Publication Data

US 2014/0362386 A1    Dec. 11, 2014

(30) Foreign Application Priority Data

Jun. 7, 2013    (FR) ..................................... 13 01305

(51) Int. Cl.
| | |
|---|---|
| G01B 11/00 | (2006.01) |
| G01S 17/87 | (2006.01) |
| G01S 5/16 | (2006.01) |
| F41G 3/22 | (2006.01) |

(52) U.S. Cl.
CPC ................. *G01B 11/002* (2013.01); *G01S 5/16* (2013.01); *G01S 17/875* (2013.01); *F41G 3/225* (2013.01)

(58) Field of Classification Search
USPC .................. 356/614, 4.01, 5.11, 138–139.03, 356/141.5; 250/206.2, 559.29; 382/291
See application file for complete search history.

(56) References Cited

U.S. PATENT DOCUMENTS

| | | | | |
|---|---|---|---|---|
| 4,896,962 | A | * | 1/1990 | Menn et al. ............... 356/139.03 |
| 5,207,003 | A | * | 5/1993 | Yamada et al. ................. 33/293 |
| 5,521,843 | A | * | 5/1996 | Hashima et al. ............... 700/253 |
| 5,767,524 | A | * | 6/1998 | Barbier et al. ........... 250/559.29 |
| 8,810,806 | B2 | * | 8/2014 | Barbier et al. ................. 356/614 |

(Continued)

FOREIGN PATENT DOCUMENTS

| | | |
|---|---|---|
| EP | 2 554 941 A1 | 2/2013 |
| EP | 2 554 942 A1 | 2/2013 |

(Continued)

OTHER PUBLICATIONS

French Search Report for French Counterpart Application No. FR 1301305, 8 pgs. (Feb. 14, 2014).

*Primary Examiner* — Sang Nguyen
(74) *Attorney, Agent, or Firm* — Blakely, Sokoloff, Taylor & Zafman LLP

(57) ABSTRACT

The general field of the invention is that of systems for detecting the posture of a mobile object. The systems according to the invention comprise a fixed electro-optical device comprising an emission source and a photosensitive sensor. The optical corner cube is arranged on the mobile object. The entry face of the corner cube has a predetermined geometry, the light coming from the source and reflected back by the corner cube forming a luminous contour on the matrix sensor. The fixed electro-optical device comprises an optical element with a known shape and location, which is placed in the vicinity of the said source and is arranged so as to form a dark zone in the central part of the luminous contour. The detection system comprises analysis means determining the position and the orientation of the mobile object from knowledge of the vanishing points of the luminous contour and the position and shape of the dark zone.

9 Claims, 10 Drawing Sheets

(56) References Cited

U.S. PATENT DOCUMENTS

2006/0165312 A1* 7/2006 Odell ............................ 382/291
2011/0079703 A1* 4/2011 Gunning et al. ............ 250/206.2
2013/0057852 A1* 3/2013 Barbier et al. ............ 356/139.03

FOREIGN PATENT DOCUMENTS

FR          2 905 456      3/2008
WO    WO 2011/067341 A1   6/2011

* cited by examiner

Side view          Front view

OPTICAL SYSTEM FOR MEASUREMENT OF ORIENTATION AND POSITION COMPRISING A POINT SOURCE, CENTRAL MASK, PHOTOSENSITIVE MATRIX SENSOR AND CORNER CUBE

BACKGROUND OF THE INVENTION

1. Field of the Invention

The field of the invention is that of optical devices making it possible to measure the orientation of an object in space without contact. There are various possible fields of application, but the main application is that of detecting the posture of the helmet of an aircraft pilot, thus making it possible to project an image into his visor in exact superposition on the exterior landscape or to slave various systems of the aircraft under his view. The precision sought in such systems is of the order of one milliradian.

2. Description of the Prior Art

There are various optical techniques for measuring the orientation of a helmet. Generally, conspicuous elements are installed on the helmet, and these are located by an optical emission and reception system. The positions of the images of these conspicuous elements make it possible to determine the position and the orientation of the helmet by calculation.

To this end, retroreflective corner cubes or retroreflectors may be used. It is sufficient to arrange the optical emission and reception components on the same axis. Owing to their nature, these systems with retroreflectors have low sensitivity to sunlight.

As an exemplary embodiment, they may be combined with a fixed optoelectronic device comprising a point source associated with an assembly comprising one or two matrix sensors without an optical objective. In this arrangement, the reflector is equipped with a mask applied onto its entry face. This mask comprises a transparent central part and an opaque peripheral part. The contour of the mask is in the shape of a parallelogram, thus embodying the orientation of two fixed directions of the helmet. The orientation of the helmet is calculated by analysing the shapes of the contour which are projected onto the sensor or sensors. The analysis relates to the transitions between the light and dark zones of the reflection received by the sensor.

A first fixed optoelectronic device of this type is represented in FIG. 1. FIG. 1 is simplified view in section in a plane (X, Z). The device comprises a point source S, a first splitter plate m making it possible to separate the emission path and the reception path, and a second neutral splitter plate m making it possible to send the light reflected by the corner cube onto two photosensitive sensors CCD1 and CCD2, which are arranged at different positions. Thus, the images of the source S which are given by the plates m and m' are the points S'1 and S'2 on the sensors CCD1 and CCD2. A variant of this first device is represented in FIG. 2. In this variant, the second splitter plate m' is replaced with a set of two plates mr and m". The first plate mr is dichroic, it reflects a first wavelength range and transmits the rest of the spectrum. The single sensor CCD therefore receives two offset shapes of the projected contour, the first in a first wavelength range and the second in the rest of the spectrum. Thus, the images of the source S which are given by the plates m and m' are the points Sr and Sv.

These fixed optoelectronic devices have some drawbacks, which are detailed below:

- The fixed optoelectronic device comprises a certain number of optical elements and two matrix sensors. It is therefore bulky and requires double image acquisition electronics;
- The light source emits in an angular aperture wide enough to cover all the possible positions of the reflector. A very large part of the light flux is therefore permanently lost, since it does not reach the reflector. This flux part is furthermore radiated into the surrounding space inside and outside the cockpit thus impairing the stealth of the device;
- The unknown position of the vertex of the corner cube reflector is determined either by analysing the image projected onto each of the two sensors or by analysing two coloured images. The uncertainty relating to the position of the vertex of the reflector, on the one hand, and the uncertainty relating to its orientation, on the other hand, are greater when the two sensors or the two images are closer to one another in orientation and/or position.

SUMMARY OF THE INVENTION

The object of the fixed optoelectronic device according to the invention is to overcome the above drawbacks by simplifying the fixed device, improving the photometric yield of the assembly and increasing the measurement precision.

The principle of the detection system is as follows. The fixed device comprises a single source, a single matrix sensor and a screen, the screen and the matrix sensor being positioned in proximity to the source. As in the previous devices, the system comprises a corner cube which has a mask and is secured to the mobile object. The back-reflection of the point source, produced by the mobile corner cube reflector and by its associated diaphragm, is projected onto the single fixed matrix sensor positioned in proximity to the source. The central part of the projected reflection permanently contains the projected shadow produced by the screen. Simple analysis of the contour of the reflection and that of the shadow contained provides the position and the orientation of the reflector, and therefore of the mobile object.

A plurality of different optical architectures make it possible to produce this reflection with two concentric contours. Thee architectures do not use semireflective mirrors, and therefore impart a high energy efficiency to the device, the photometric yield thus being multiplied by eight.

The calculation precision is improved by using the known value of the angle between the directions of the contour of the diaphragm or mask, on the one hand, and the known value of the angle between the directions of the contour of the screen, on the other hand. Since the system according to the invention uses only 3 single matrix sensor, the device is therefore more compact and requires simpler electronics than a system with two sensors.

More precisely, the invention relates to A system for detecting the posture of an object which is mobile in space, comprising a fixed electro-optical device with a known orientation comprising at least one emission source, a photosensitive matrix sensor and at least one optical corner cube, which is arranged on the mobile object and of which the entry face has a predetermined geometry, the light coming from the source and reflected back by the corner cube forming a luminous contour on the matrix sensor, characterized in that the fixed electro-optical device comprises an optical element with a known shape and location, which is placed in the vicinity of the said source and is arranged so as to form a dark zone in the central part of the luminous contour, the detection system comprising analysis means arranged so a to determine the position and the orientation of the mobile object from knowledge of the vanishing points of the luminous contour and the position and shape of the dark zone.

Advantageously, the optical element is a point screen or a plane screen in the shape of a parallelogram or hexagon.

Advantageously, the optical element consists of three rectangular surfaces forming a trirectangular trihedron.

Advantageously, the optical element is a mirror comprising a reflective surface having a central opening.

Advantageously, the central opening is in the shape of a hole or parallelogram or hexagon.

Advantageously, the fixed electro-optical device comprises an optical system making it possible to form an image of the source on the optical element.

Advantageously, the entry face of the corner cube comprises a mask delimiting a transparent zone in the shape of a triangle, parallelogram or hexagon.

Advantageously, the corner cube is composed of three mutually orthogonal mirrors, each of the mirrors comprising a mask delimiting a reflective zone in the shape of a rectangle.

BRIEF DESCRIPTION OF THE DRAWINGS

The invention will be better understood, and other advantages will become apparent, on reading the following description given without implying limitation and with the aid of the appended figures, in which.

DETAILED DESCRIPTION

Figure 1:
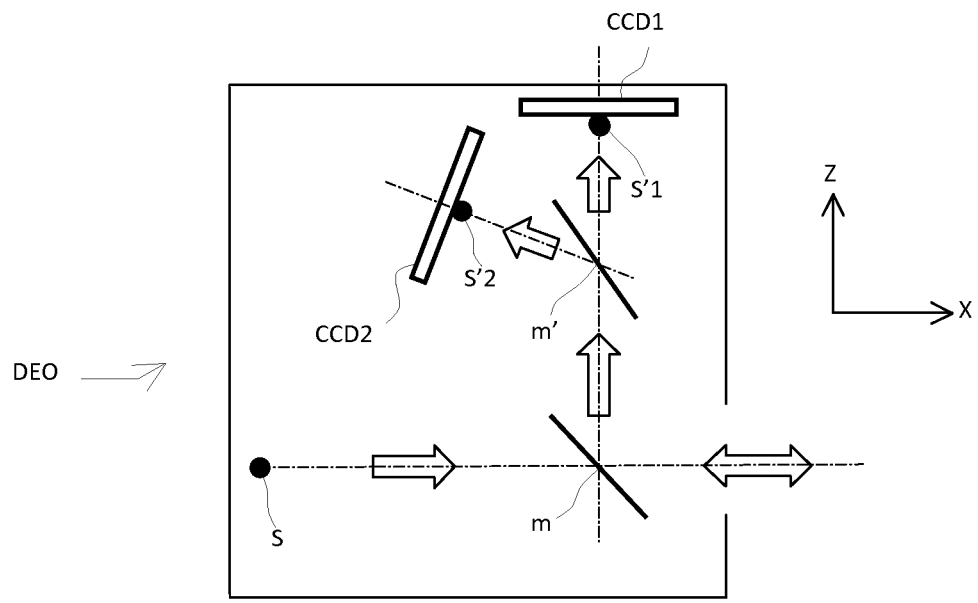
FIGS. 1 and 2, described above, represent fixed optoelectronic devices according to the prior art.
Figure 2:
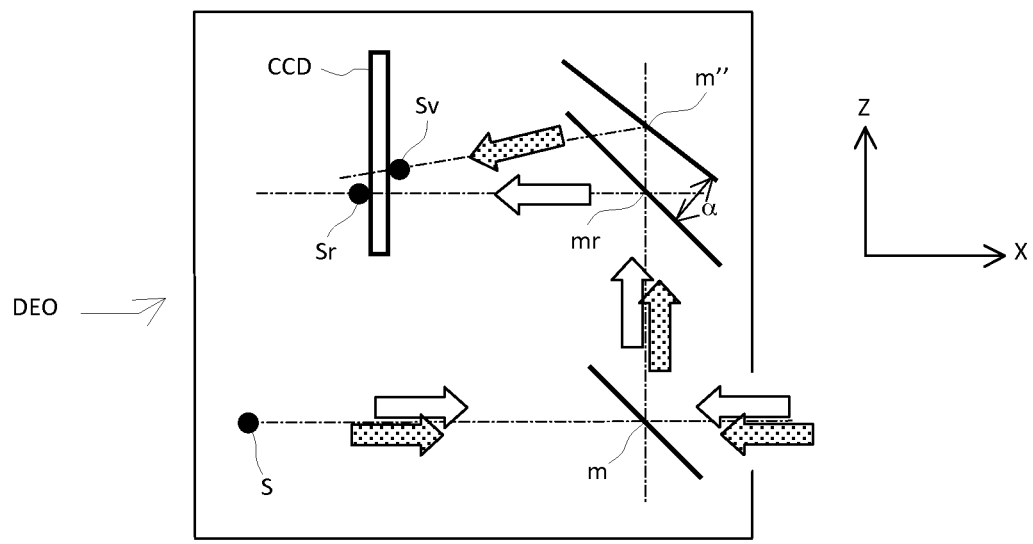
Figure 3:
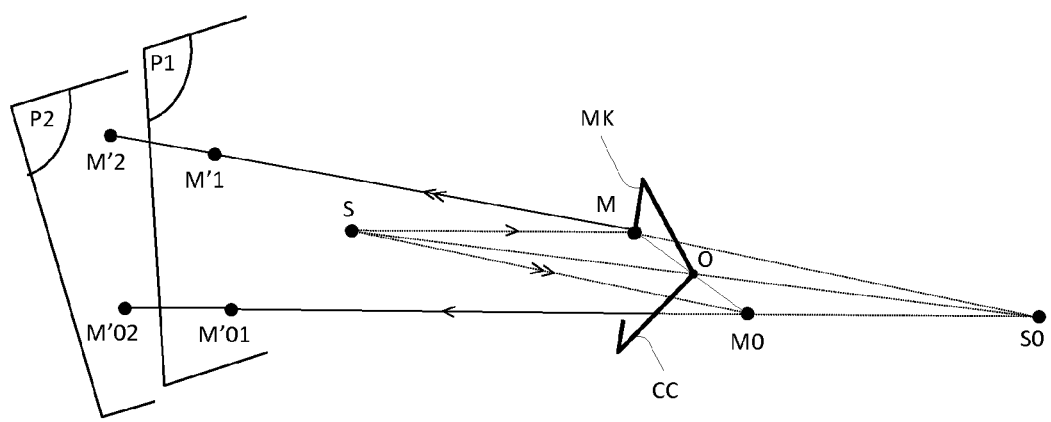
FIGS. 3, 4 and 5 illustrate the general principles at the detection system according to the invention.

As mentioned, and as represented in FIG. 3, there are optical detection systems in the prior art which comprise a fixed electro-optical device for emission and acquisition, comprising two matrix sensors CM1 and CM2 and a corner cube CC, which is carried by the mobile object. The corner cube CC is equipped with a mask MK with a known contour. For each of the points M of the mask MK, two pairs of image points (M'1, M'01) and (M'2, M'02) are collected on the two planes P1 and P2 of the two sensors CM1 and CM2, these image points being obtained by the projection of centre S0, the symmetrical of the point source S with respect to the vertex O of the corner cube. The orientation of the sides of the contour of the reflection on each sensor gives the position of the point S0 and therefore the unknown position of the vertex O, on the one hand, and the orientation of the mask, on the other hand.

In the device according to the invention, the fixed electro-optical device comprises only a single sensor, which collects only a single reflection of the mask MK. This reflection is locally modulated by the shadow of a fixed element. The assembly makes it possible to determine the position of the point S0 and the orientation of the mask. The invention is based on the following observation, in the cross section of the light beam reflected by the corner cube, only the peripheral part of the reception beam, with a transverse dimension about twice that of the mask, provides information of interest, that is to say the shape of the projected contour and the level of illumination along the projected contour.

Figure 4:
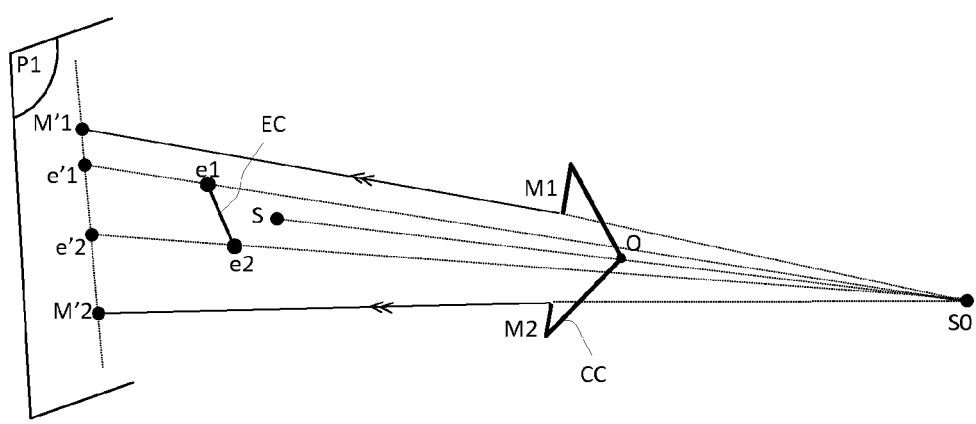

Consequently, an occulting element EC, placed as indicated in FIG. 4 in proximity to the source S, does not modify:
the emission flux towards the corner cube;
the shape of the contour of the projected reflection;
or the illumination in the vicinity of the contour of the projected reflection.

It generates a shadow projected onto the plane P1 of a single matrix sensor. This shadow is located in the central region of the reflection of the mask, and its shape and its position depend only on the position of the centre of projection S0, which is the mirror-image of the point S with respect to the centre O of the corner cube. This information is sufficient in order to determine fully the position and the orientation of the corner cube.

Figure 5:
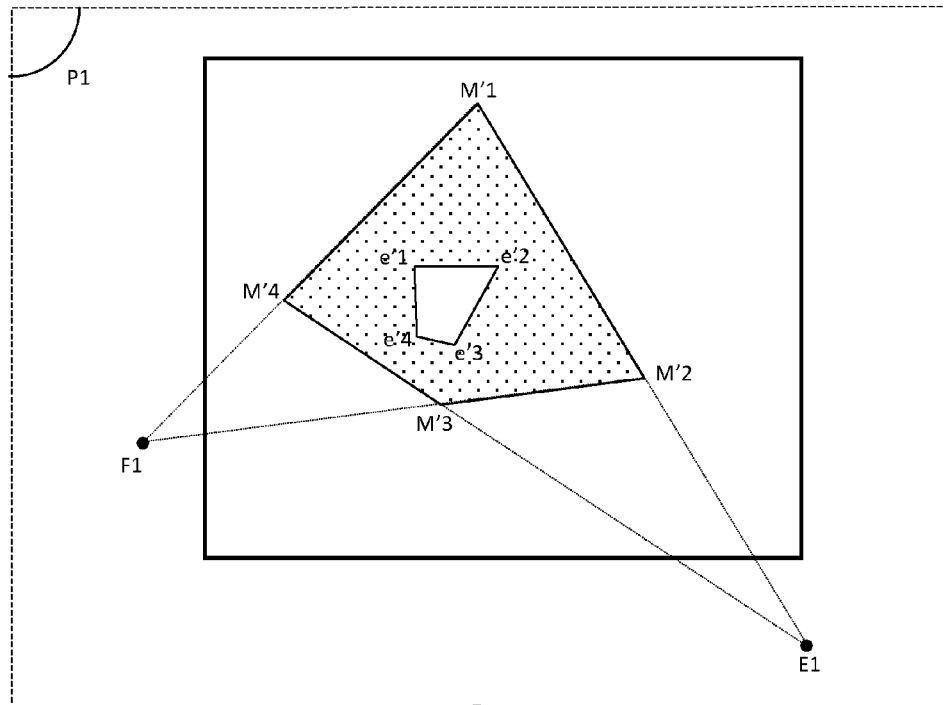

The occulting element may have various forms. As a first example, the known fixed screen EC is a quadrilateral delimited by four points e1, e2, e3 and e4. As can be seen in FIG. 5, the source generates a projected shadow of this fixed screen on the plane P1 of the sensor. This shadow is delimited by the four points e'1, e'2, e'3 and e'4. It is located in the central region of the reflection of the mask. Its shape and its position depend only on the position of the centre of projection S0, which is the symmetrical of S with respect to O.

The overall reflection produced on the plane P1 of the sensor CM1 thus consists of a luminous surface of contour M'1, M'2, M'3, M'4, in the shape of a quadrilateral, which corresponds to the image of the entry surface of the corner cube, and of a dark surface, centred approximately on the luminous surface and with a contour e'1, e'2, e'3 and e'4, also in the shape of a quadrilateral.

As can be seen in FIG. 5, for a mask M1, M2, M3 and M4 in the shape of a parallelogram, the points of convergence E1 and F1 of the sides of the quadrilateral M'1, M'2, M'3, M'4 projected onto the plane P1 are the two vanishing points corresponding to the two directions of the contour of the mask.

The unknown position of the centre of projection S0 is given by the point of convergence of the lines joining each vertex e1, e2, e3 and e4, with known positions, of the contour of the fixed screen to the projected vertices e'1, e'2, e'3 and e'4, with measured positions, of the contour of the shadow on the plane P1 of the single sensor.

Figure 6:
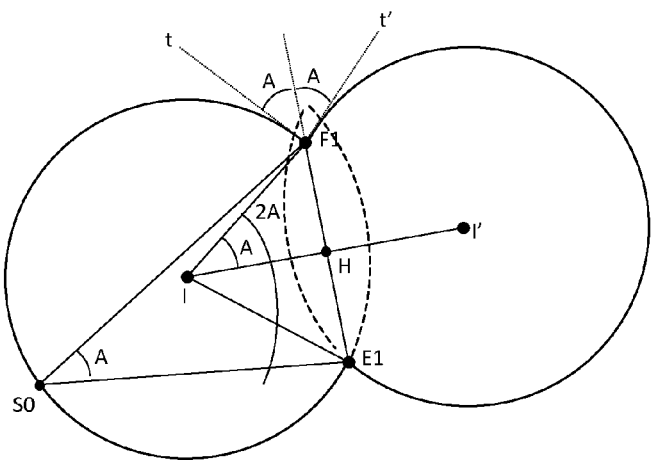
FIGS. 6, 7, 8 and 9 illustrate the determination of the position of the image of the source by reflection on the corner cube.
Figure 7:
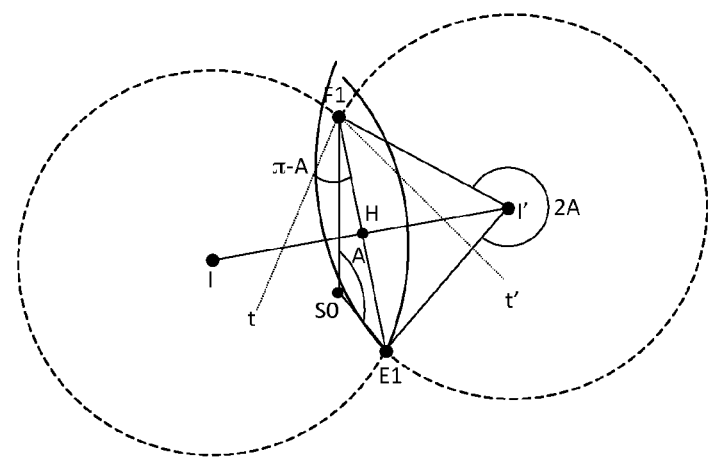

It is possible to improve the measurement precision of the position of the point S0 by using the following property. S0 belongs to a particular curved surface, which is represented in FIGS. 6 and 7. Specifically, the two sides M1M2 and M1M4 of the mask make between them an angle A, which is known by design. This angle A is, by the principle of the projection, equal to the angle between the two directions determined by the segments S0E1 and S0F1. The segment E1F1, with a centre H, is therefore seen from S0 at a constant angle A. In any plane containing E1F1, consequently, S0 belongs to the portion of a circle centred on I, the point from which the segment E1F1 is seen at the angle 2A, the angle at the centre being equal to twice the angle subtended.

In space, the point S0 is therefore located on the surface of revolution generated by rotation, about the axis E1F1, of the circle arc E1F1, this being the portion of the circle of radius r centred at a distance d on the perpendicular bisector of E1F1.

The distance d and the radius r are given by the following formulae;

$$d=IH=[(E1F1)/2]/\operatorname{tg}A \text{ and } r=IE1=[(E1F1)/2]/\sin A.$$

FIG. 6 gives in bold the section of this surface of revolution on an arbitrary plane containing the axis E1F1, when the angle A is less than 90°. This surface is a spindle torus, with a "pumpkin" shape.

FIG. 7 gives in bold the cross section of this surface of revolution when the angle A is greater than 90°. This surface is an ovoid with cusps at the vertices E1 and F1.

When the angle A is equal to 90°, corresponding to a rectangular mask, the surface is that of a sphere centred on H and with a radius r=E1F½.

Figure 8:
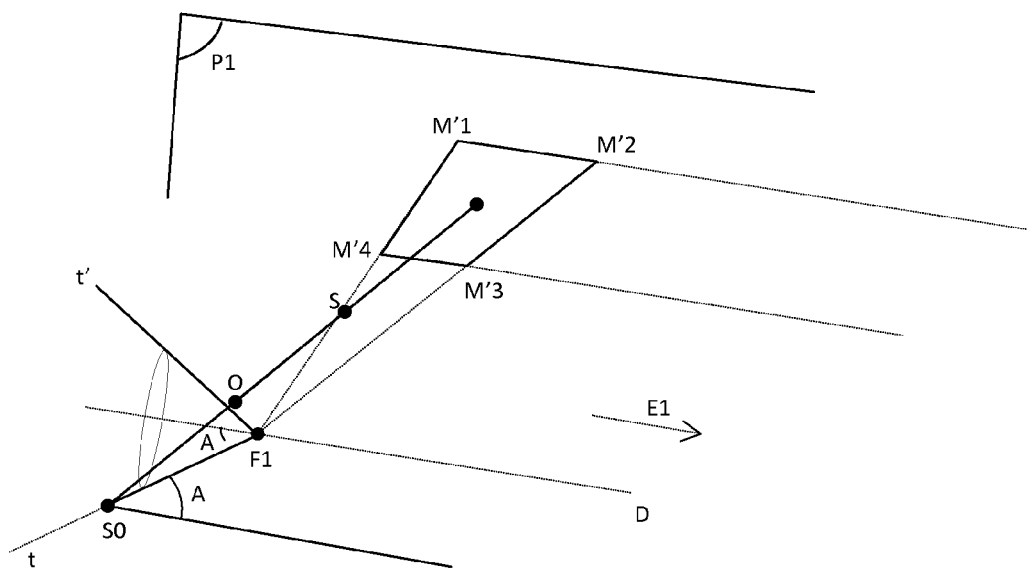

When one of the directions, for example the direction common to the sides M1M2 and M3M4 of the mask, is parallel to the projection plane P1 of the matrix sensor, the projected quadrilateral becomes a trapezium in which the sides M'1M'2 and M'3M'4 are parallel to the direction D common to the sides M1M2 and M3M4 of the mask. One of the two vanishing points, for example E1, is therefore at infinity in a direction D as represented in FIG. 8. The direction of the vanishing point E1 is represented by an arrow in this figure. The angle A, which is known by design, between the two sides M1M2 and M1M4 of the mask is the angle between the direction D and the unknown direction S0F1. The point S0 then belongs to the cone with a vertex F1, axis D and angle A. In FIG. 6, this cone corresponds to the cone with an angle A and an axis E1F1, generated by rotation about the axis E1F1 of the tangent F1-t to the circle of centre I, or of the tangent F1-t' to the circle of centre I'. This cone tangent to the torus at F1 represent the degenerate shape of the torus when the distance E1F1 is infinite. In FIG. 7, this cone corresponds to the cone of angle (π–A) and axis E1F1, generated by the tangents F1-t or F1-t'. When the angle A is equal to 90°, this cone is the plane perpendicular to D passing through F1.

Figure 9:
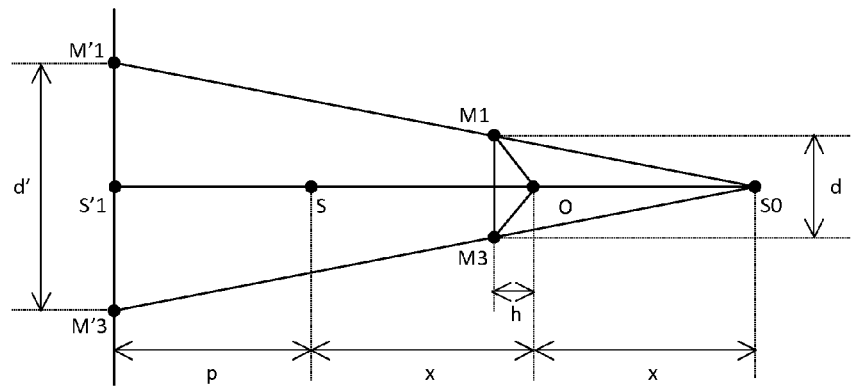

On the plane of the mask is parallel to the projection plane P1, the two vanishing points are both at infinity and the projected quadrilateral becomes a parallelogram. Two other design data are then used in order to determine the point S0, as indicated in FIG. 9. These are the distance h between the vertex O of the reflector and the plane of the mask, on the one hand, and the length d of one of the diagonals of the mask, for example M1-M3, on the other hand. The projected diagonal M'1-M'3 which is parallel to M1-M3, has the measured length d'. The projected diagonals M'1-M'M'3 and M'2-M'4 are concurrent at their middle, which is the point S'1, the projection of S and of O. The position of the source S is known, and consequently the line S'1-S and its length p are known. The desired position of S0 on the line S'1-S is given by the following expression, which expresses the fact that S and S0 are symmetrical with respect to O:

$$(x+h)/d=(p+2x)/d'.$$

It can be deduced therefrom that, for d' not equal to 2 d, $$x=p/[(d'/d)-2].$$

The abscissa of S0 on the axis S'1-S is given by the relation:

$$S'1-S0=p+2x$$

The case of d' equal to 2 d corresponds to the situation in which S is on the plane P1, which is a design configuration excluded by assumption.

After determination of S0, the orientation of each side of the mask MK of the corner cube is given by the orientation of each of the two lines (S0-E1) and (S0-F1).

If the screen EC is a parallelogram e1, e2, e3 and e4, the points e and f, which are the intersections of the sides of the projected quadrilateral e'1, e'2, e'3 and e'4, are the two vanishing points corresponding to the two directions of the screen EC, of which the angle "a" between the two directions of the sides is known. The segment e-f is seen at the angle "a" from the point S0, and S0 therefore also belongs to a defined surface of revolution. Furthermore, the absolute orientation of each side of the screen EC is known with respect to the plane P1 of the matrix sensor. Consequently, the desired point S0 is located at the intersection of the two lines coming from the two vanishing points e and f, which lines are parallel to the corresponding sides of the contour of the screen EC.

These two additional ways of locating S0 by means of the two vanishing points of the screen EC constrain the directions of the contour of the fixed screen EC not to be parallel to the projection plane P1.

Figure 10:
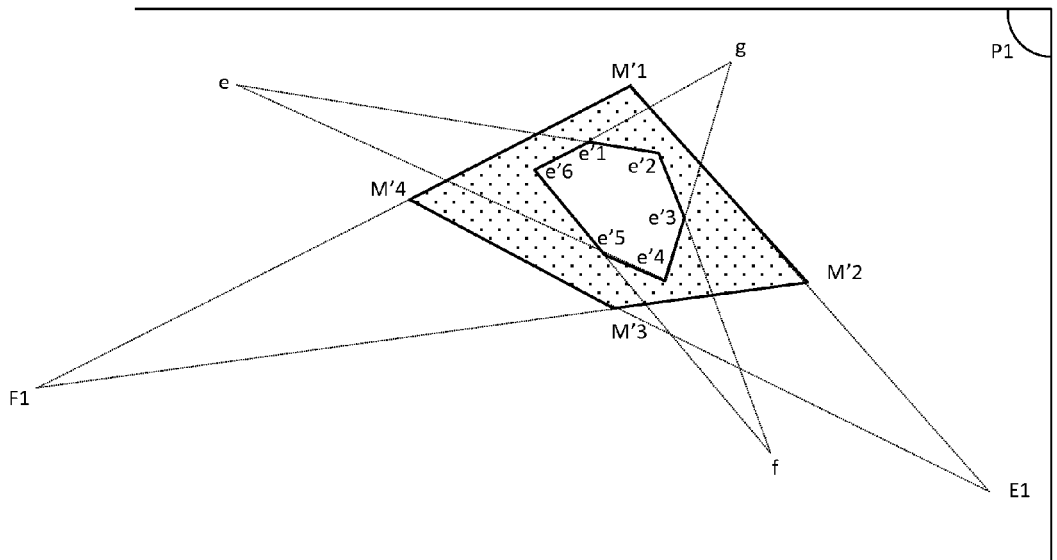
FIGS. 10 to 14 represent different shapes of the optical element according to the invention and the corresponding shapes of the dark zones.

An improvement in the precision of the determination of S0 can be obtained with the aid of a third vanishing point g by means of a screen EC with a hexagonal contour e1, e2, e3, e4, e5 and e6, consisting of six coplanar sides which are pairwise parallel and not parallel to the projection plane P1. FIG. 10 schematises on P1 the obtained contour of the shadow e'1, e'2, e'3, e'5 and e'6 and that of the luminous reflection M'1, M'2, M'3, M'4 for a reflector mask in the shape of a parallelogram.

Figure 11:
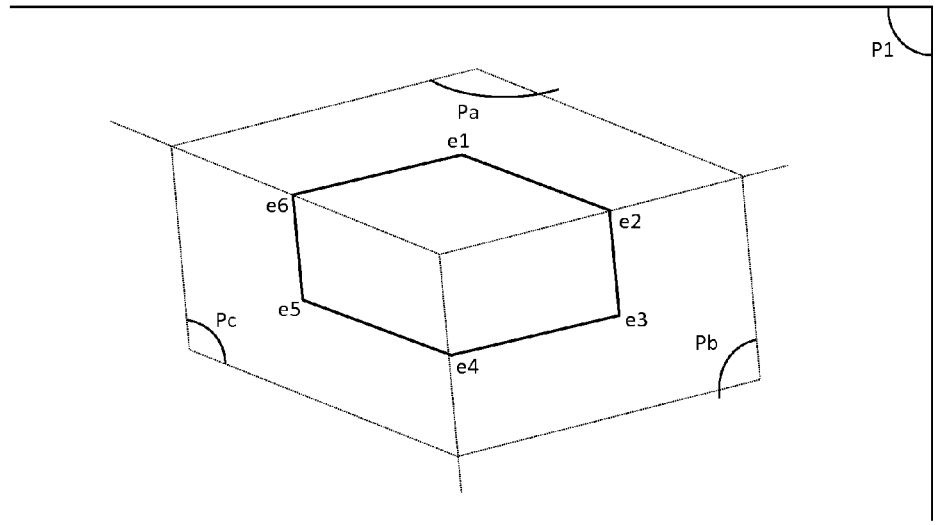

This hexagonal contour of the screen EC with pairwise parallel sides may also be distributed according to a dihedron consisting of two planes not parallel to P1. As represented in FIG. 11, it may also be distributed according to a trihedron consisting of three planes Pa, Pb and Pc, which are not parallel to P1 and have arbitrary mutual orientations.

The three angles between the three planes of the trihedron may be selected to be right angles. A corner parallelepiped is then obtained. All the angles of the hexagonal contour of the mask EC are then right angles, and the point S0 becomes the point of convergence of three spheres whose diameters are the three sides of the triangle "efg" consisting of the three vanishing points of the contour e'1, e'2, e'3, e'4, e'5 and e'6 on P1.

The sides of the contour may have the same length, in which case the occulting screen EC is a corner cube.

Figure 12:
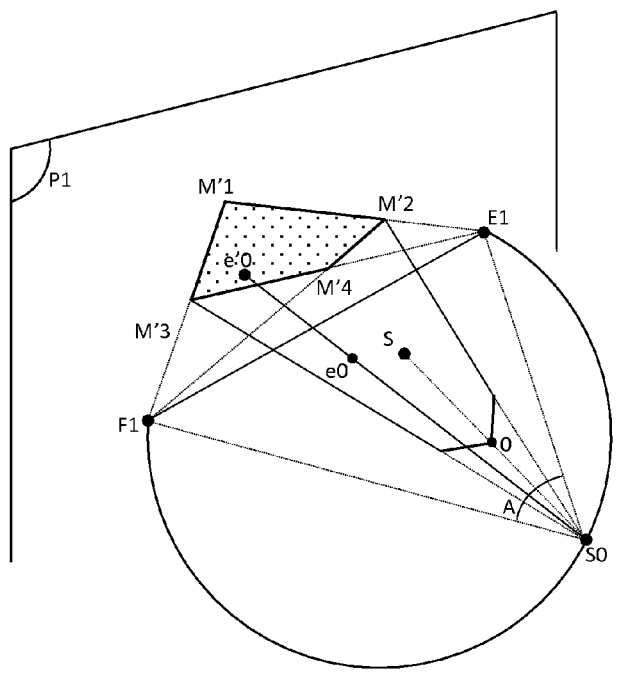

As a second example, the known fixed screen is a "point" screen, that is to say one which has small dimensions compared, for example, with the dimensions of the mask of the corner cube. The screen EC is reduced to a single point e0, which is projected at e'0 onto the plane P1 of the sensor. As represented in FIG. 12, the position of S0 is therefore at the intersection of the line e0-e'0 and the surface of the torus of axis E1F1, from which the segment E1F1 is seen at the angle A.

The advantage of a screen with small dimensions is that it avoids occulting the contour of the luminous reflection when the latter is also of small size, namely for large illumination incidences on the reflector, that is to say at the extreme edges of the angular field of the reflector.

Figure 13:
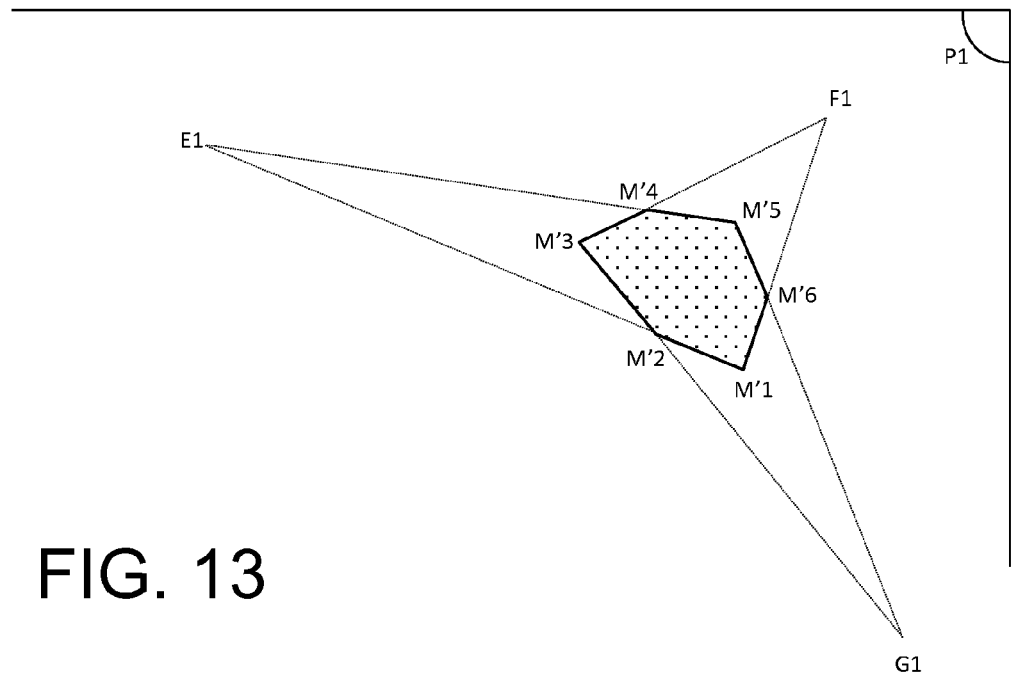
Figure 14:
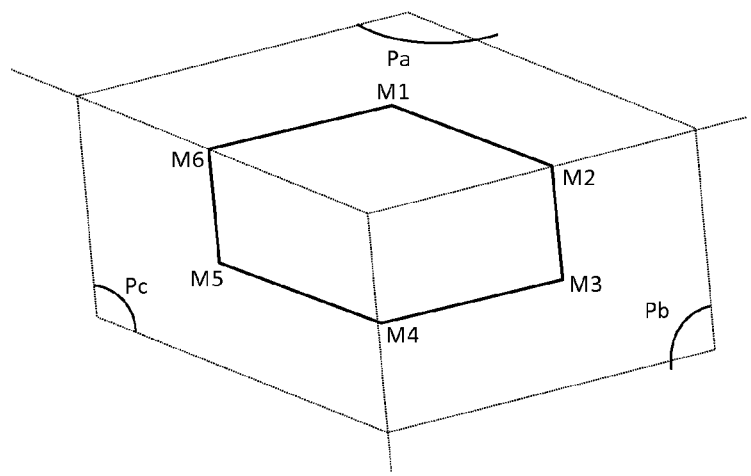

The corner cube mask may also be of triangular or hexagonal shape. In the general case, in which none of the three directions of the contour is parallel to the plane P1, as represented in FIG. 13, the three vanishing points E1, F1 and G1 of the resulting hexagonal contour M'1, M'2, M'3, M'4, M'5 and M'6 produced on the plane P1 and the known angles between the sides of the contour of the mask define the three tori of axes E1F1, F1G1 and G1E1, the point of convergence of which is the desired point S0.

if the mask has a hexagonal contour, the three directions of the sides of the hexagonal contour of the mask may be distributed according to one, two or three planes. In the case of trihedral distribution, the three planes (Pa, Pb, Pc) represented in FIG. 14, supporting the sides of the hexagonal contour, may be mutually orthogonal. These three planes may be those of the three mirrors constituting the corner cube reflector, in which case the contour of the mask is formed by two sides of the contour of each mirror. All the angles of the hexagonal contour are then right angles, and the desired point S0 becomes the point of convergence of the three spheres whose diameters are the three sides of the triangle E1F1G1 in FIG. 12, consisting of the three vanishing points of the hexagonal contour M'2, M'3, M'4, M'5 and M'6 on P1.

The redundancy of the data making it possible to determine the orientation and the position of the corner cube, which is obtained by virtue of the presence and the specific shape of the contour of the occulting screen EC, makes it possible to increase significantly the precision in position and the precision in orientation.

There are various possible arrangements for producing the electro-optical device according to the invention comprising an optical element making it possible to produce central obturation in the luminous contour reflected by the corner cube. This device with occultation should fulfil the following functions:
- transmitting the beam emitted by the point source in the direction of the corner cube;
- transmitting the beam reflected by the corner cube towards the photosensitive sensor while suppressing the central part from the peripheral part of the beam.

Various embodiments of electro-optical devices are represented by way of examples in FIGS. 15 to 21.

Figure 15:
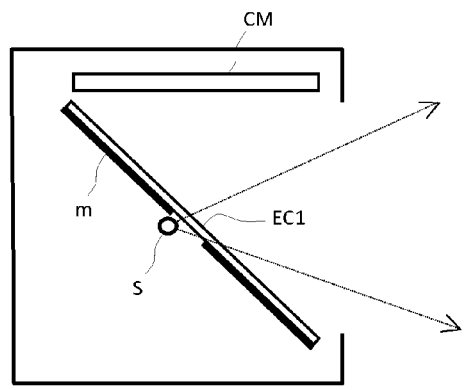
FIGS. 15 to 21 represent different arrangements of the fixed electro-optical device with a known orientation according to the invention.
Figure 16:
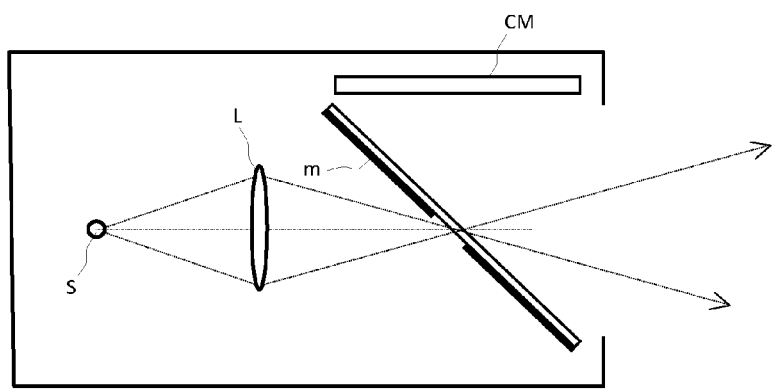

A first embodiment is represented in the cross-sectional views of FIGS. 15 and 16. The electro-optical device essentially comprises a point source S, a matrix sensor CM, and a mirror m comprising a transparent central opening EC1. In a first variant, the source is arranged behind this central opening. The radiation emitted by the source S passes through this opening EC1 and is reflected by the corner cube (not represented in FIG. 15). The peripheral part of the luminous contour is reflected by the mirror m towards the matrix sensor CM, while its central part is lost. A luminous contour with a dark zone is obtained. The opening EC1 of the mirror therefore corresponds to the obturating optical element. It may be reduced to a simple hole or have a more complex geometrical shape, as has been seen. A mask may be added at the source S so that the source does not directly illuminate the matrix sensor CM.

In a simple variant, which is represented in FIG. 16, focusing optics L which forms an image of the point source at the centre of the mirror are added. The emission angle of the source is thus controlled by modifying the focal length and aperture of the focusing optics. The latter arrangement makes it possible to use laser sources emitting beams of parallel light which are focused by the focusing optics L.

Figure 17:
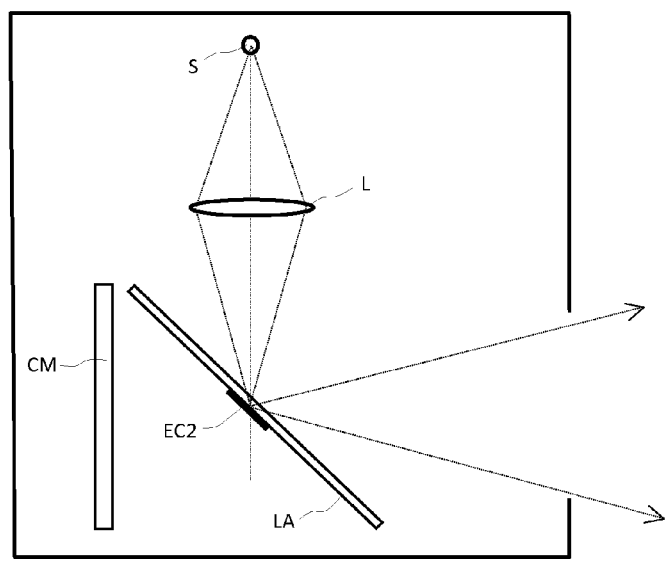

In a second variant, which is represented in FIG. 17, a transparent plate LA comprising a reflective central part EC2 may be used. This plate is, for example, a thin plate with parallel plane faces. A luminous contour with a dark zone is obtained in the same way. The reflective central part corresponds to the obturating optical element. Here again, it may be in the form of a point or have a more complex geometrical shape.

Figure 18:
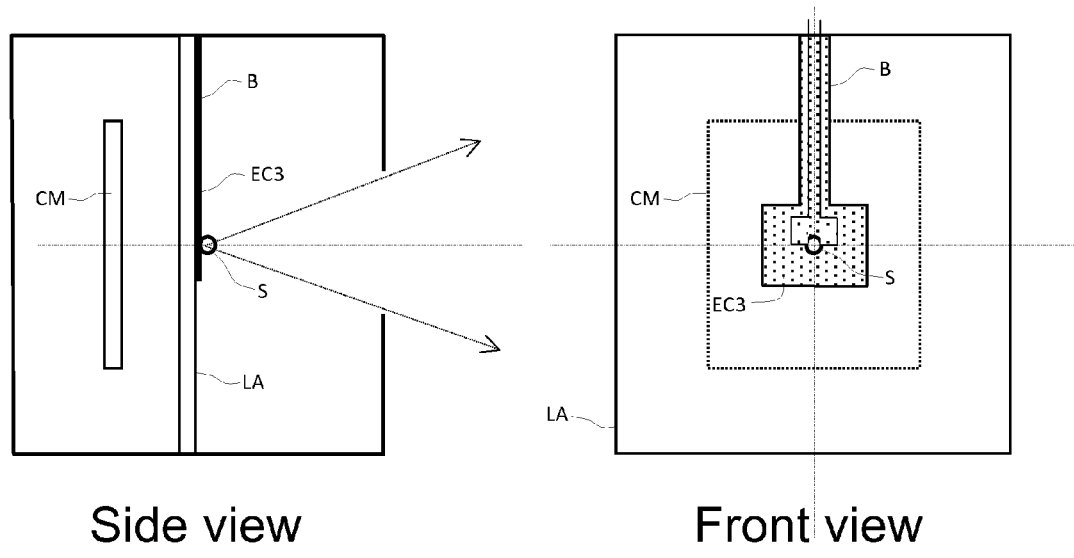
Figure 19:
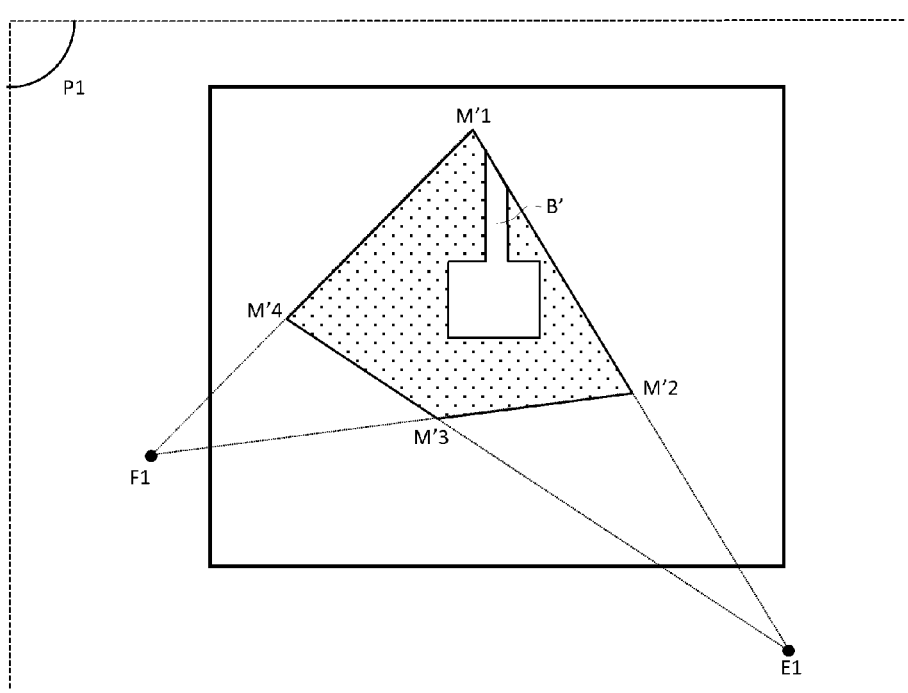

A second embodiment of the electro-optical device according to the invention is represented in FIG. 18. This FIG. 18 comprises a side view and a front view of the device. In this case, the electro-optical device essentially comprises a point source S, a matrix sensor CM, and a transparent plate LA comprising an opaque central screen EC3. The point source S is fixed in the vicinity of the centre of the opaque central screen. The central screen EC3 comprises an extension in the shape of a bar B. making it possible to mask the cabling of the point source. Here again, a luminous contour with a dark zone is obtained on the sensor CM, as can be seen in FIG. 19, which represents the image obtained on the matrix sensor. In the case of FIGS. 18 and 19, the central screen has a rectangular shape. The image B' of the bar is easily identifiable, and in no way interferes with identification of the sides of the shade.

Figure 20:
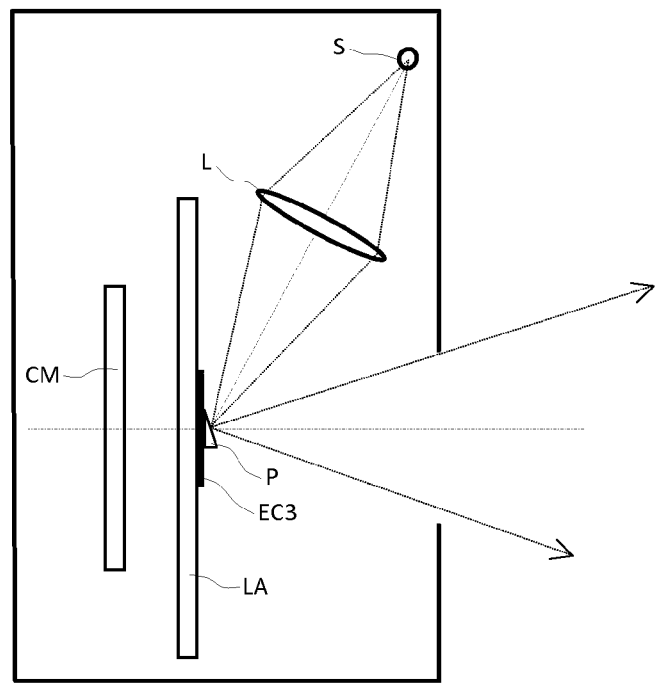
Figure 21:
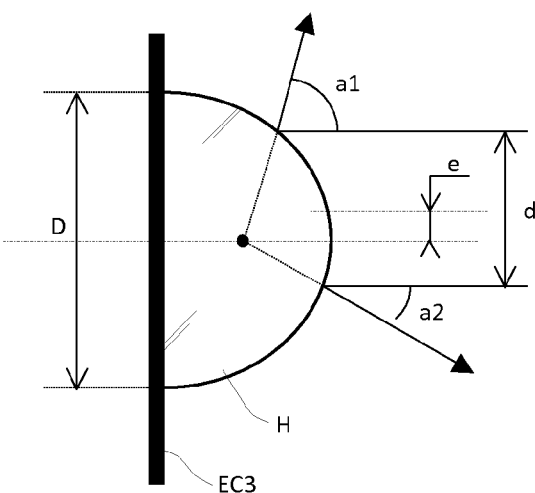

In an alternative embodiment, which is represented in FIG. 20, focusing optics L which form an image of the point source S at the centre of the opaque central screen are added. The central screen comprises an optical element P making it possible to reflect the radiation of the source in the desired direction. The emission angle of the source is thus controlled. This optical element may be a small prismatic mirror. It may also be a hemispherical mirror H with a short focal length, as can be seen in FIG. 21. The source S is then an incident laser beam.

The position and the diameter of the mirror H are selected so as to ensure the deviation "a" and the divergence "da" which are required for the beam illuminating the corner cube reflector. As represented in FIG. 21, for an offset e of the beam in an equatorial plane between the centre of the hemispherical mirror H of diameter D and the axis of the incident beam of diameter d, the central deviation "a" and the divergence "da" of the beam are given by:

$$\tan a \approx e/(D/4), \text{ i.e. } a \approx 4e/D \text{ and;}$$

$$da = a1 + a2 \approx 4a/D.$$

The radiation of the point source S may equally well have a narrow spectral brand, a broad spectral band, or a multi-line spectral band, in or outside the visible band.

The matrix sensor may equally well be equipped with coloured filters of the mosaic type, or be without the said coloured filters.

What is claimed is:

1. A detection system for detecting a posture of a mobile object which is mobile in space, the detection system comprising a fixed electro-optical device with a known orientation, the fixed electro-optical device comprising at least one emission source, a photosensitive matrix sensor, and at least one optical corner cube which has a mask and is arranged on the mobile object, and of which an entry face of the mask has a predetermined geometry, light coming from the emission source and reflected back by the optical corner cube forming a luminous contour corresponding to a reflection of the mask on the matrix sensor,
wherein the fixed electro-optical device further comprises an occulting optical element with a known shape and location, which is placed in a vicinity of the emission source and is arranged so as to form a dark zone in a central part of the luminous contour, the detection system comprising an analysis device including electronics arranged to determine a position and an orientation of the mobile object from knowledge of vanishing points of the luminous contour and a position and a shape of the dark zone.

2. The detection system according to claim 1, wherein the occulting optical element is a point screen.

3. The detection system according to claim 1, wherein the occulting optical element is a plane screen in a shape of a parallelogram or a hexagon.

4. The detection system according to claim 1, wherein the occulting optical element consists of three rectangular surfaces forming a trirectangular trihedron.

5. The detection system according to claim 1, wherein the optical element is a mirror comprising a reflective surface having a central opening.

6. The detection system according to claim 5, wherein the central opening is in a shape of a hole, a parallelogram, or a hexagon.

7. The detection system according to claim 1, wherein the fixed electro-optical device comprises an optical system to form an image of the emission source on the occulting optical element.

8. The detection system according to claim 1, wherein the entry face of the optical corner cube comprises a mask delimiting a transparent zone in a shape of a triangle, a parallelogram, or a hexagon.

9. The detection system according to claim 1, wherein the corner cube is composed of three mutually orthogonal minors, each of the minors comprising a mask delimiting a reflective zone in a shape of a rectangle.

\* \* \* \* \*